US008721917B2

(12) United States Patent
Cherian et al.

(10) Patent No.: US 8,721,917 B2
(45) Date of Patent: May 13, 2014

(54) POLISHING OF SAPPHIRE WITH COMPOSITE SLURRIES

(75) Inventors: Isaac K. Cherian, Shrewsbury, MA (US); Abhaya K. Bakshi, Westford, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 978 days.

(21) Appl. No.: 12/286,960

(22) Filed: Oct. 3, 2008

(65) Prior Publication Data

US 2009/0104851 A1  Apr. 23, 2009

Related U.S. Application Data

(60) Provisional application No. 60/997,988, filed on Oct. 5, 2007.

(51) Int. Cl.
*C09K 13/00* (2006.01)

(52) U.S. Cl.
USPC ............ 252/79.1; 252/79.2; 438/693; 216/89

(58) Field of Classification Search
USPC ........ 438/692, 693, 691, 694; 252/79.1, 79.2, 252/792, 79.3, 79.4; 216/108, 89
See application file for complete search history.

(56) References Cited

U.S. PATENT DOCUMENTS

| 4,249,913 | A | 2/1981 | Johnson et al. |
| 4,429,003 | A | 1/1984 | Fredriksson et al. |
| 4,959,113 | A | 9/1990 | Roberts |
| 4,997,461 | A | 3/1991 | Markhoff-Matheny et al. |
| 5,009,675 | A | 4/1991 | Kunz et al. |
| 5,042,991 | A | 8/1991 | Kunz et al. |
| 6,062,952 | A | 5/2000 | Robinson |
| 6,139,763 | A | 10/2000 | Ina et al. |
| 6,365,520 | B1 * | 4/2002 | Rhoades et al. ............. 438/690 |
| 6,527,817 | B1 | 3/2003 | Fang et al. |
| 6,726,990 | B1 | 4/2004 | Kumar et al. |
| 6,918,821 | B2 * | 7/2005 | Balijepalli et al. ............. 451/41 |
| 2001/0045063 | A1 | 11/2001 | Kambe et al. |

(Continued)

FOREIGN PATENT DOCUMENTS

| AU | 2008308580 | 12/2011 |
| CA | 2700408 | 4/2009 |

(Continued)

OTHER PUBLICATIONS

International Search Report for Related International Application No. PCT/US2008/078747 (4 pages).

(Continued)

*Primary Examiner* — Lan Vinh
(74) *Attorney, Agent, or Firm* — Mike W. Crosby; Abel Law Group, LLP (57) ABSTRACT

Improved slurry compositions comprising a mixture of a first type of particles and a second type of abrasive particles dispersed within an aqueous medium, and abrasive slurry compositions for use chemical mechanical planarization (CMP) processes, particularly abrasive slurry compositions for polishing of sapphire. These abrasive slurry compositions comprise a mixture of a first type of abrasive particles having a hardness that is harder than the surface being polished and a second type of abrasive particles have a hardness that is softer than the surface being polished, particularly mixtures of silicon carbide abrasive particles and silica abrasive particles, dispersed within an aqueous medium.

30 Claims, 4 Drawing Sheets

(56) References Cited

U.S. PATENT DOCUMENTS

| | | | |
|---|---|---|---|
| 2002/0111024 A1* | 8/2002 | Small et al. | 438/689 |
| 2002/0111027 A1* | 8/2002 | Sachan et al. | 438/692 |
| 2003/0121214 A1* | 7/2003 | Ishibashi | 51/309 |
| 2003/0168627 A1* | 9/2003 | Singh et al. | 252/79.1 |
| 2004/0060502 A1* | 4/2004 | Singh | 117/68 |
| 2004/0132306 A1* | 7/2004 | Bellman et al. | 438/690 |
| 2004/0157535 A1 | 8/2004 | Atenafu et al. | |
| 2005/0008557 A1 | 1/2005 | Yadav et al. | |
| 2007/0087667 A1* | 4/2007 | Laconto et al. | 451/41 |
| 2009/0101625 A1 | 4/2009 | Cherian et al. | |
| 2009/0215269 A1* | 8/2009 | Boggs et al. | 438/693 |

FOREIGN PATENT DOCUMENTS

| | | |
|---|---|---|
| CN | 1222495 | 7/1999 |
| CN | 101815771 A | 10/2007 |
| EP | 0 387 748 | 9/1990 |
| EP | 1 006 166 A1 | 6/2000 |
| EP | 2215176 | 8/2010 |
| GB | 526130 | 9/1940 |
| GB | 1247374 | 9/1971 |
| GB | 2401370 A | 10/2004 |
| JP | 11-293231 | 10/1999 |
| JP | 2000-160139 | 6/2000 |
| JP | 2001072479 A | 3/2001 |
| JP | 2003321276 | 11/2003 |
| JP | 2003321276 A | 11/2003 |
| JP | 2004189576 | 7/2004 |
| JP | 2004-331887 A | 11/2004 |
| JP | 2005-523574 A | 8/2005 |
| JP | 2007-105833 A | 4/2007 |
| JP | 2010540759 | 12/2010 |
| KR | 1019910006451 | 4/1991 |
| KR | 10-2000-0047799 | 7/2000 |
| KR | 20100068432 | 6/2010 |
| KR | 20120131237 | 12/2012 |
| WO | 01/32799 | 5/2001 |
| WO | 03/072683 A1 | 9/2003 |
| WO | WO 2004/030041 A2 | 4/2004 |
| WO | 2004096733 | 11/2004 |
| WO | WO 2004/096941 | 11/2004 |
| WO | 2007041199 | 4/2007 |
| WO | 2009046293 | 4/2009 |

OTHER PUBLICATIONS

The Written Opinion for International Application No. PCT/US2008/078747 (8 pages).

European Article 94(3) Communication for Related European Application No. 08 835 177.0 dated Dec. 20, 2010.

NPL—Quanli et al., "Effect of particle size on oxidation of silicon carbide powders," Ceramics International 33 (2007) 309-313, available online Dec. 28, 2005.

International Search Report for Related International Application No. PCT/US2008/078741 (3 pages).

Zhuxian Yang et al., "Periodic mesoporous organosilica mesophases re versatile precursors for the direst preparation of mesoporous silica/carbon composites, carbon and silicon carbide materials," Journal of Materials chemistry, vol. 16, No. 33, Sep. 7, 2006, pp. 3417-3425, XP002511883, ISSN: 0959-9428.

Dumm, "Characterization of low-level, oversize particles in abrasive powders," KONA No. 23 (2005).

Stover, "Oxidation of ultrafine (Si-)SiC powders," J. of Mat. Sci., vol. 29, No. 14, 3791-3796 (1994), abstract.

* cited by examiner

PROPERTIES OF SAPPHIRE

| PHYSICAL | | THERMAL | |
|---|---|---|---|
| Chemical formula | $Al_2O_3$ | Thermal conductivity (60° to c-axis) at 25°C | 0.065 cal $cm^{-1} s^{-1} °C^{-1}$ |
| Crystal structure | Hexagonal system (rhombohedral) | Thermal expansion coefficient (60° to c-axis) 25-800°C | 8.40 x $10^{-6} °C^{-1}$ |
| Unit cell dimension | a = 4.758 Å, c = 12.991Å | Specific heat at 25°C | 0.10 cal $g^{-1}$ |
| Density | 3.98 g $cm^{-3}$ | Heat capacity at 25°C | 18.6 cal $°C^{-1} mol^{-1}$ |
| Hardness | 9 mohs, 1525-2000 Knoop | | |
| Melting Point | 2040°C | | |
| Boiling point | 2980°C | | |
| MECHANICAL (psi = 6.9 kPa) | | ELECTRICAL | |
| Tensile stregnth | 40,000-60,000 psi (design criterion) | Volume resistivity | $10^{14}$ Ohm-cm |
| Flexural stregnth | 70,000-130,000 psi (design criterion) | Dielectric strength | 480,000 V $cm^{-1}$ |
| Young's modulus | 50x$10^6$ psi | Dielectric constant | |
| Compressive modulus | 55x$10^6$ psi | E perpendicular to c-axis E parallel to c-axis | 9.4 |
| Flexural modulus | 52x$10^6$ psi | | 11.5 |
| Rigidity modulus | 21.5x$10^6$ psi | Dissipation factor, *tan delta* | $10^{-4}$ |
| Volumetric modulus of elasticity (bulk modulus) | 35x$10^6$ psi | | |
| Poisson's ratio | 0.29 | | |

POLISHING OF SAPPHIRE WITH COMPOSITE SLURRIES

The present application claims the benefit of U.S. provisional application No. 60/997,988 filed Oct. 5, 2007, which is incorporated by reference herein in its entirety.

FIELD OF THE INVENTION

The present invention generally relates to improved slurry compositions, and more particularly to composite slurry compositions comprising a dual particle system. In some embodiments, the dual particle system comprises a first type of particles having a first hardness and a second type of particles having a second hardness greater than the first hardness, for example, a composite slurry comprising silicon carbide and silica particles. The slurry compositions are particularly suitable as abrasive slurry compositions and, in particular, for polishing R-plane and A-plane sapphire wafers. The present invention also provides methods of making the slurry compositions and methods for planarizing and polishing a surface using the compositions.

BACKGROUND OF THE INVENTION

Sapphire is the single-crystal form of aluminum oxide ($Al_2O_3$) possessing excellent optical, mechanical, and chemical properties. For example, sapphire retains its high strength at high temperatures, has good thermal properties, excellent transparency, excellent chemical stability, possesses chip resistance, durability, scratch resistance, radiation resistance, and flexural strength at elevated temperatures.

For extreme conditions such as those found in high-temperature or harsh chemical environments, the unique properties of sapphire make at a cost-effective solution for those applications where long life and high performance are a must. Sapphire is widely used for various electronic and optical parts, test and analytical applications (e.g. NMR spectroscopy, thermo-optical temperature measurement, mass spectroscopy, biological and chemical sample analysis, sensor windows, FLIR, spectroscopy, and IR), lamps and lamp envelopes (e.g. electronic infrared countermeasures, ultraviolet sterilization, and high-intensity lamps).

Sapphire is increasingly becoming the material of choice for engineers faced with design challenges in the semiconductor manufacturing industry. For example, the properties provided by sapphire make it suitable for use in plasma containment tubes, process gas injectors, thermocouple protection assemblies, viewports and sight windows, end effectors, gas diffusion plates, substrates, and wafers.

Figure 4:
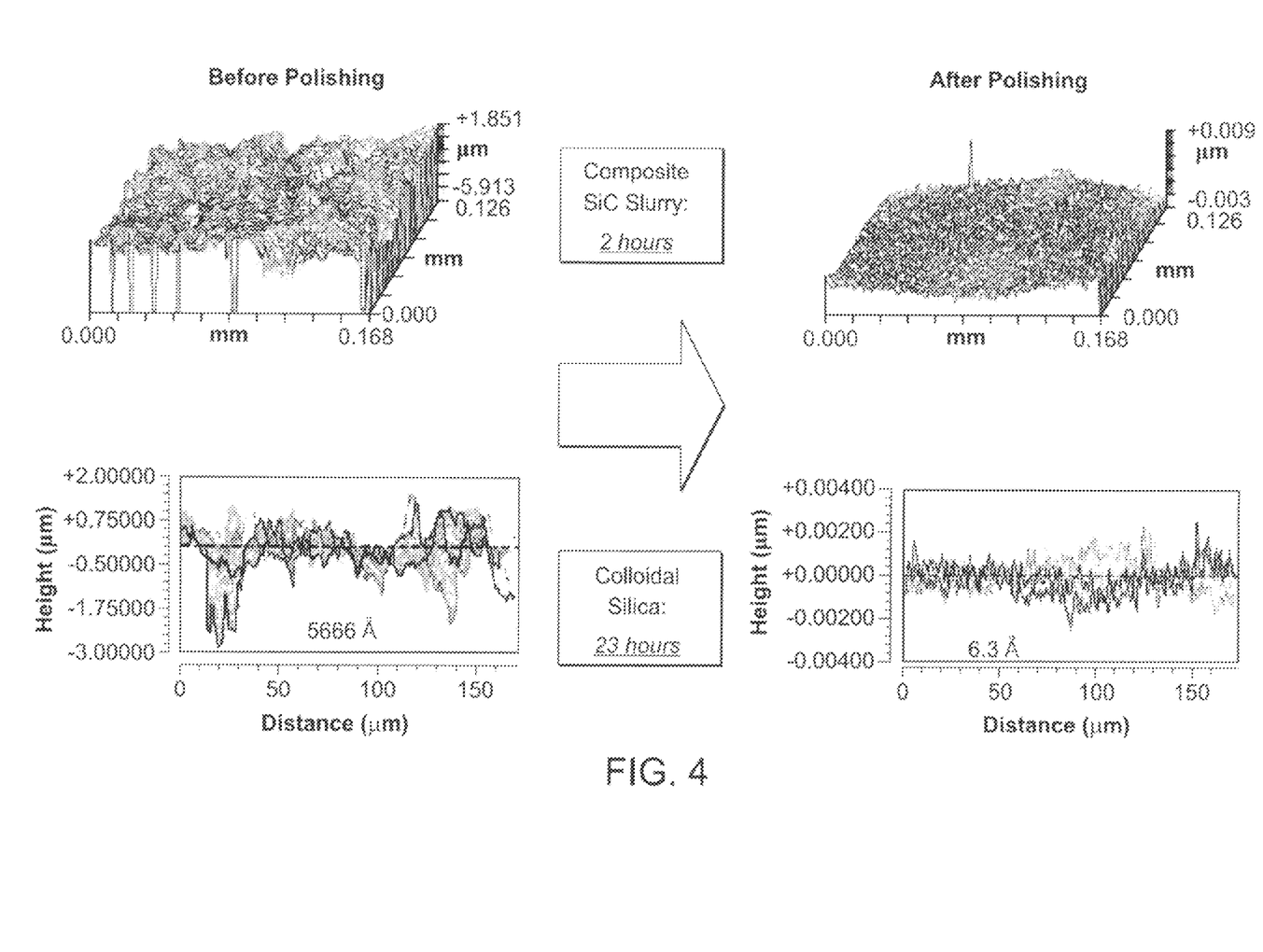
FIG. 4 shows the surface texture before and after polishing R-plane sapphire with the composite silicon carbide/silica slurries of the present invention vs. a colloidal silica slurry. As shown, polishing of a R-plane sapphire having an Ra=5666 Å to an Ra=6.3 Å takes 23 hours using a colloidal slurry but only 2 hours using a composite silicon carbide/silica slurry of the present invention.

Sapphire has a rhombohedral type structure and is a highly anisotropic material, with properties that are largely dependent on crystallographic orientation. The properties shown in the table of FIG. 4 are average values for different orientations.

Figure 3:
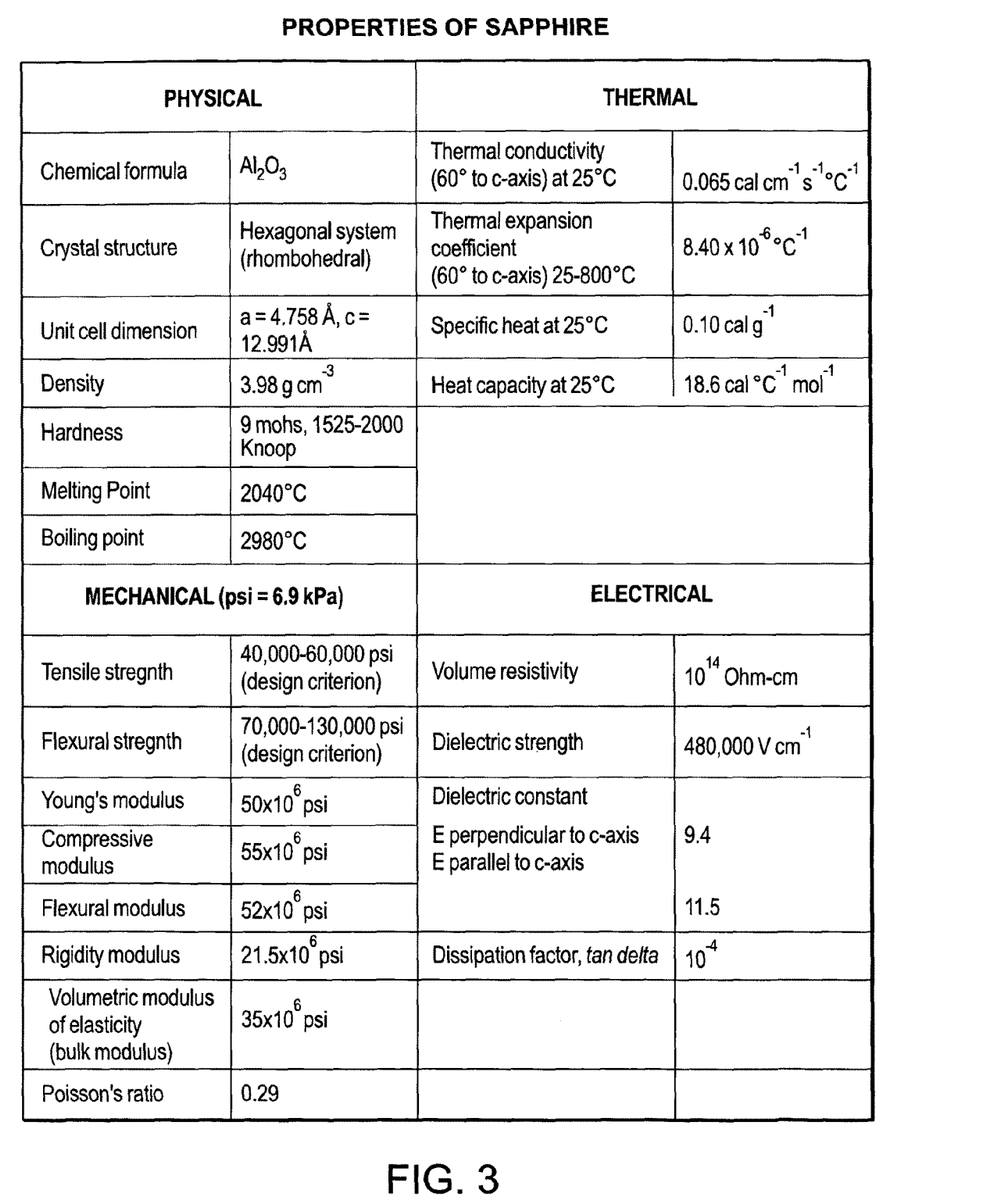
FIG. 3 sets forth a table of some average values for the different orientations of sapphire.

Sapphire wafers are typically cut along a crystallographic axis such as the C-plane (0001) which is also referred to as the zero-degree plane, A-plane (1120) which is also referred to as the 90 degree plane, and R-plane (1102) which is 57.6 degrees from the C-plane. These various planes are depicted in FIG. 3.

C-plane sapphire substrates are used to grow III-V and II-VI compounds such as GaN for blue LED and laser diodes. In addition, C-plane sapphire is useful for infrared detector applications and optical systems.

R-plane sapphire substrates are used for the hetero-epitaxial deposition of silicon for microelectronic IC, semiconductor, microwave and pressure transducer applications. R-plane sapphire is also an excellent choice for hybrid substrates such as microwave IC's because of its high dielectric constant. In addition, when filmed with an epitaxial silicon process, high speed IC and pressure transducers can be created. R-plane sapphire is also useful in growing thallium, other superconducting components, high impedance resistors, GaAs, and provide a stable platform for carrying or bonding other materials. R-plane sapphire has been found to be approximately 4 times more resistant to polishing than C-plane sapphire.

A-plane sapphire substrates provide a uniform dielectric constant and high insulation for hybrid microelectronic applications. Further, high Tc superconductors can be grown with A-plane sapphire substrates.

While sapphire provides numerous advantages, due to sapphire's hardness and resistance to chemical attack, polishing and planarizing sapphire presents many difficulties. Hard abrasives having high removal rates are often required to provide acceptable polishing rates. However, these abrasives can scratch and damage the sapphire surface. While softer, slower acting abrasives can be used to reduce this potential for scratching and damage, the downside with such abrasives is the often unacceptable times required to achieve the desired level of surface polishing and planarization.

Given these and other deficiencies observed in the art, it would be highly desirable to develop improved abrasive slurry compositions that provide fast removal rate while still minimizing defects and scratching.

SUMMARY OF THE INVENTION

This invention provides improved slurry compositions. In some embodiments, the slurry compositions are in the form of abrasive slurry compositions. Such abrasive slurry compositions solve the deficiencies of conventional compositions. The present compositions greatly improve polishing and planarization performance and efficiency in planarizing and polishing a variety of surfaces. The present compositions reduce surface defects while attaining excellent planarity with high material removal rate.

In one aspect, the invention generally relates to a slurry composition comprising two different types of particles dispersed in an aqueous medium.

Embodiments according to this aspect of the invention can include the following features. The first type of particles can be silicon carbide. The second type of particles can be silica particles. The silicon carbide particles can have an average particle size up to and including about 300 nm. The silicon carbide particles can have an average particle size ranging from about 40 nm to about 300 nm. The silica particles can comprise colloidal silica and fumed silica. The silica particles can have an average particle size less than about 100 nm. The silica particles can have an average particle size ranging from about 10 to about 300 nm. The silicon carbide particles can comprise nano-sized α-silicon carbide particles. The silicon carbide particles can comprise particles having at least portions of their surfaces coated with silica such that the silicon carbide particles have a surface chemistry similar to silica. The silicon carbide particles can comprise β-silicon carbide particles. The slurry can contain at least about 0.1 wt % particles. The slurry can contain at least about 5 wt % particles. The composition can comprise from about 10 wt % to about 50 wt % particles. The composition can comprise at least about 2 wt % silicon carbide particles. The composition can comprise from about 2 wt % to about 30 wt % silicon carbide particles. The composition can comprise at least about 10 wt % silica particles. The composition can comprise from about 10 wt % to about 50 wt % silica particles. The composition can comprise from about 10 wt % to about 30 wt % silicon carbide particles and from about 10 wt % to about 50 wt % silica particles based on the weight of slurry. The composition can comprise about 30 wt % silicon carbide particles and about 70 wt % silica particles based on the weight of total abrasive particles. The slurry composition can be an abrasive slurry composition. The abrasive slurry composition can be adapted for polishing a surface, e.g. sapphire wafers. The abrasive slurry composition can comprise abrasive particles dispersed in an aqueous medium, the abrasive particles comprising a mixture of a first type of abrasive particles having a hardness that is harder than the surface being polished (e.g. sapphire) and a second type of abrasive particles have a hardness that is softer than the surface being polished (e.g. sapphire). Both particles can possess similar electrokinetic behavior (i.e zeta potential, iso-electric point). The composition can comprise an amount of first abrasive particles sufficient to increase the rate of R-plane sapphire polishing to a particular surface roughness by at least 30%, and in some cases, at least about 35%, 40%, 45%, and even 50% relative to the rate of the composition without the first abrasive particles. The composition can comprise an amount of silicon carbide particles sufficient to increase the rate of R-plane sapphire polishing to a particular surface roughness by at least 30%, and in some cases, at least about 35%, 40%, 45%, and even 50% relative to the rate of the composition without silicon carbide particles.

In another aspect, the invention generally relates to a method for polishing a surface, particularly sapphire. The method comprises abrading the surface with a slurry composition comprising a mixture of a first type of abrasive particles having a hardness that is harder than the surface and a second type of abrasive particles have a hardness that is softer than the surface.

Embodiments according to this aspect of the invention can include the following features. The first type of abrasive particles can be silicon carbide. The second type of abrasive particles can be silica.

Other aspects and advantages of the invention will become apparent from the following description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DESCRIPTION

The slurry compositions of the present invention comprise a dual particle system comprising a mixture of two different types of particles dispersed in an aqueous medium. For example, a first type of particle can be silicon carbide and a second type of particle can be silica.

In some embodiments, the slurry compositions provided by the present invention are abrasive slurry compositions suitable for use in various polishing and planarization processes including CMP, pre-polishing step for stock removal, texturing, etc. Such processes can be used to polish and planarize the surfaces of various materials including the various layers in semiconductor devices. Some examples of semiconductor materials that the present slurries can be used to polish and planarize include sapphire ($Al_2O_3$), diamond (C), silicon (Si), germanium (Ge), silicon carbide (SiC), silicon germanide (SiGe), aluminum antimonide (AlSb), aluminum arsenide (AlAs), aluminum nitride (AlN), aluminum phosphide (AlP), boron nitride (BN), boron arsenide (BAs), gallium antimonide (GaSb), gallium arsenide (GaAs), gallium nitride (GaN), gallium phosphide (GaP), indium antimonide (InSb), inidium arsenide (InAs), indium nitride (InN), and indium phosphide (InP). Thus, the disclosure to follow should be construed as illustrative rather than in a limiting sense. For example, while certain combinations of materials and concentrations may be provided, such combinations of materials and concentrations are based on CMP processing of sapphire surfaces, particularly R-plane sapphire, and could be suitably modified for other types of processes and for polishing and planarizing various materials (including A-plane and C-plane sapphire). Further, while embodiments are set forth wherein a composite slurry comprises silica particles and silicon carbide particles, other combinations of particles having differing hardness can also be used.

In some embodiments, the slurry compositions of the present invention are in the form of abrasive slurry compositions s particularly suitable for polishing and planarizing sapphire, particularly R and A-plane sapphire wafers. These slurries provide smooth topographies and uniform thicknesses required in the formation of R-plane sapphire wafers. The present abrasive slurry compositions can provide benefits similar to those demonstrated herein with R-plane sapphire when used to polish A-plane and C-plane sapphire wafers, particularly when compared to the use of pure silica slurries or silicon carbide slurries. It is further believed that the present slurry compositions will provide advantages similar to those demonstrated with R-plane sapphire when used to polish other substrates such as silicon carbide and gallium nitride substrates.

The silicon carbide (SiC) particles of the present slurries can be any commercially available silicon carbide particles. The particle size of the silicon carbide is not particularly limited. For example, when the slurries are abrasive slurries, in general, very small particle size can result in an unacceptably low polishing rate, while particles that are too large can scratch the surface of the article being polished. In some embodiments, the silicon carbide particles are nano-sized and, for example, the silicon carbide particles can have a particle size of no greater than about 300 nm. In some embodiments, the particle size of the silicon carbide particles is no greater than about 200 nm. In some embodiments the particle size ranges from about 40 nm to about 300 nm, in some embodiments from about 70 nm to about 200 nm, and in other embodiments from about 100 nm to about 150 nm.

In some embodiments, at least some of the silicon carbide particles behave similar to silica and, for example, possess properties similar to silica. In some embodiments, the silicon carbide is formed using the Acheson process or similar known processes. In some embodiments, these silicon carbide particles possess a surface chemistry similar to silica. In certain embodiments, these silicon carbide particles are coated, particularly with a conformal coating of silica. The coating can be provided, for example, by depositing a silica coating on the silicon carbide particles using compositions capable of providing a silica coating, or by oxidation (e.g., thermal oxidation, chemical oxidation, and combinations thereof). The silicon carbide particles can be provided with a silica coating such that the coated silicon carbide particles behave similarly to silica particles. Without being bound by theory, it is believed that the silica coating provides the silicon carbide with a surface chemistry similar to or identical to silica, wherein the surface chemistry of the silicon carbide particles is similar to or identical to silica. As a result, the coated particles will be very compatible with all slurry chemistries formulated around silica particles such that the coated silicon carbide particles are easily dispersed in these slurry chemistries. If required, dispersion of the particles can be further facilitated by simply adjusting the pH as required (e.g., above the isoelectric point of the silicon carbide particles, e.g. pH=3.0). Thus, the coated silicon carbide particles will tend to be stable under conditions where silica particles would be stable, resulting in decreased agglomeration. Further, in some embodiments wherein the slurries are abrasive slurries, the silica coating is provided so as to "soften" the silicon carbide particles, thereby reducing defects and scratching normally associated with silicon carbide polished workpieces. The coating by oxidation reaction has further been found to "blunt" or reduce sharp corners of the silicon carbide particles, thereby further reducing defects and scratching of the polished workpiece. Further, the material removal rate of the coated particles is improved using the coated silicon carbide particles since the underlying core is hard and the particles have a higher density than typical silica particles.

As used herein, a "coating", when referring to a silica coating on silicon carbide particles, means generally that the silicon carbide particles have silica on at least a portion of their surface to an extent necessary to provide the silicon carbide particles with a surface chemistry similar to silica. The coating can be in the form of a particulate coating of silica on a silicon carbide core, a non-particulate, film-like coating of silica on a silicon carbide core, and combinations thereof. FIGS. 5A and 5B show photographs of silicon carbide particles prior to coating and after coating by oxidation. In some embodiments, at least about 50%, on average, of the surface of the particles is coated with silica. The amount of the surface of a given particle coated with silica can range from about 50% to about 100%, for example, at least about 60%, 70%, 80%, 90%, and 95%. The coating on a given particle can be uniform in thickness or, in some embodiments, it can vary in thickness on a given particle. Further, the thickness of coatings on the silicon carbide particles can be uniform or can vary among the particles.

In some embodiments, the silicon carbide is nano-sized α-silicon carbide having a surface potential similar to silica. In some embodiments, the nano-sized α-silicon carbide has an iso-electric point of about 2.2. The particles can have a hexagonal crystal structure. Without being bound by theory, it is believed that a low iso-electric point similar to silica indicates that the particles have silica on their surface, at least to some extent. In certain embodiments, the α-silicon carbide is provided with a coating of silica by, for example, depositing a silica coating on the silicon carbide particles using compositions capable of providing a silica coating, or oxidizing the particles (e.g., thermal oxidation, chemical oxidation, and combinations thereof). Thus, in some embodiments, the silicon carbide particles of the present invention comprise nano-sized α-silicon carbide which, as formed, possesses a low iso-electric point, in some cases similar to that of silica. The α-silicon carbide particles can be used as such or can be subjected to further oxidation/coating as desired.

In some embodiments, the silicon carbide is commercially available β-silicon carbide, which tends to have a higher iso-electric point than α-silicon carbide (see e.g., FIG. 1) and, thus, generally does not disperse quite as readily as the α-silicon carbide. In certain embodiments, the β-silicon carbide is coated, at least to some extent, with silica by, for example, depositing a silica coating on the silicon carbide particles using compositions capable of providing a silica coating, or oxidizing the particles (e.g., thermal oxidation, chemical oxidation, and combinations thereof). In some embodiments, the particles are coated to an extent that provides the particles with a surface chemistry (surface potential/iso-electric point) similar to that of silica.

Without being bound by theory, it is believed that when the slurries are abrasive slurries, the silica properties, for example, the surface chemistry or silica coating provided on the outer surface of the silicon carbide particles (as evidenced by the silica-like surface potential and iso-electric point), enhances CMP and other polishing processes by electrochemically attacking the surface of substrates (e.g. crystal, ceramic, and mineral substrates). In other words, the silica properties, "coating", or oxidized portion(s) of the silicon carbide particles, behaves like silica particles. The reacted layer of the substrate can then more easily be removed by the abrasive nature of the particles. Further, the silicon carbide particles exhibit very good dispersability at high pH. By adding silicon carbide to silica at high pH, a stable slurry with well-dispersed, hard silicon carbide particles is obtained, which increases mechanical removal. While not wishing to be bound by theory, it is believed that since both surfaces (silicon carbide and silica) have high negative charge, they repel each other and disperse well (i.e. electrostatic repulsion). Further, because the surfaces of the particles have oxide coatings (silicon dioxide, i.e. silica), chemical reaction is unhindered. As a result, a composite slurry containing silica and silicon carbide particles, particularly with α-silicon carbide or silica coated silicon carbide particles, will provide a strong chemical reaction by silica and a faster mechanical removal by the silicon carbide.

The silica ($SiO_2$) abrasive particles of the present slurries can be any conventional silica particles. When the slurries are abrasive slurries, any conventional silica particles that are used for abrasive/polishing applications can be used in the present slurries. In some embodiments, colloidal silica is used. Colloidal silica as an abrasive for polishing is used in a wide spectrum of applications that span planarization needs of materials used in semiconductor manufacturing as well as those of hard materials in optics, and wafers in LED manufacturing. The dominant polishing mechanism driven by colloidal silica is that it is a reactive abrasive and, as such, it reacts with surface of the substrate being polished to form a silicate under the conditions of polishing. The resultant silicate surface is then vulnerable to mechanical erosion/chemical attack, leading to material removal rate of the substrate being polished.

As with the silicon carbide particles, the particle size of the silica is not particularly limited and is selected in view of the particular application of the slurry composition. For example, in abrasive slurries, the particle size of the silica is selected in view of, e.g. the decrease in polishing rate as particle size is reduced and the potential for surface scratching as the particle size increases. In some embodiments, the silica particles have an average particle size ranging from about 10 nm to about 300 nm. In some embodiments, the silica comprises colloidal silica, which generally has a particle size of the order of less than 100 nm. Both colloidal and fumed silicas can be used in the practice of the present invention.

The total amount of particles in the present slurry compositions, including the silica and silicon carbide particles, is generally at least about 0.1% by weight of the slurry. In some embodiments, the total amount of particles in the slurry is at least about 1%, at least about 2%, at least about 3%, at least about 4%, at least about 5%, at least about 6%, at least about 7%, at least about 8%, at least about 9%, and in some embodiments at least about 10%. In some embodiments, the total amount of particles in the slurry ranges from about 0.1% to about 50% by weight of the slurry, in some embodiments from about 7% to about 50% by weight of the slurry, in some embodiments from about 7% to about 40% by weight of the slurry, in some embodiments from about 10% to about 50% by weight of the slurry, and in some embodiments, from about 10% to about 40% by weight of the slurry. However, it is understood that the total amount of particles can be adjusted based on the use of the slurry. For example, wherein the slurry is an abrasive slurry, the total amount of particles can be adjusted based on factors such as the surface being polished and the ratio of soft ($SiO_2$) to hard (SiC) particles in the slurry. Thus, for example, if more aggressive polishing is desired, the total amount of particles can be increased and/or the ratio of hard to soft particles can be increased while increasing, maintaining, or decreasing the total amount of particles. Further, polishing conditions (such as pressure and pH of the slurry) can also be adjusted to provide desired polishing properties.

The amount of silicon carbide in the slurry generally accounts for at least about 0.02% by weight of the slurry, in some embodiments ranges from about 0.1% to about 10% by weight of the slurry, and in some embodiments ranges from about 2% to about 10% by weight of the slurry. The total amount of silica in the slurry generally accounts for at least about 0.08% by weight of the slurry, and in some embodiments at least about 10% by weight of the slurry. In some embodiments, the total amount of silica ranges from about 0.5% to about 50% by weight of the slurry, in some embodiments from about 5% to about 50% by weight of the slurry, and in some embodiments ranges from about 10% to about 50% by weight of the slurry. In an exemplary embodiment, the total amount of silica in the slurry is about 70% by weight and the total amount of silicon carbide is about 30% by weight. However, as set forth, depending on the application of the slurry these ratios an be adjusted to provide the proper balance of the two types of particles. For example, where the slurry is an abrasive slurry, depending on the particulars of the surface being polished and the desired rate and properties of the polishing process, these ratios an be adjusted to provide the proper balance of hard and soft particles. In general, for example, it may be desirable to increase the amount of silicon carbide for harder surfaces, while the amount of silica may can be increased for more delicate and softer surfaces. In one exemplary embodiment, the silicon carbide accounts for about 10% to about 30% of the slurry, while the silica accounts for about 10% to about 50% of the slurry, with the silicon carbide having an average particle size within the range of about 40 nm to about 300 nm and the silica having an average particle size within the range of about 20 nm to about 200 nm. In an exemplary embodiment, the total weight of solids in the composition comprises about 30 wt % based on total weight of the slurry, with colloidal silica accounting for about 21 wt % and silicon carbide accounting for about 9 wt %.

The silicon carbide and silica particles are dispersed within an aqueous medium that can contain any combination of conventional slurry ingredients such as solvents, pH adjusters, chelating agents, lubricants, corrosion inhibitors, surface modifiers, inhibiting agents, rheology agents, oxidizing agents, and deionized water. As used herein, "dispersed" is understood to mean that the silicon carbide and silica particles are distributed throughout the aqueous medium, preferably evenly distributed.

Rheology agents are generally included in slurries to increase the slurry viscosity and to structure the laminar flow of the slurry such that vertical fluid motion is reduced. Any conventional rheology agents can be used in the present slurry compositions, including, but not limited to, cross-linked acrylic polymers and water soluble polymers (WSPs). Some examples include modified cellulose derivatives, cellulose ethers, starch derivatives, pectin derivatives, polyacrylamides, hydroxypropylcellulose, hydroxyethylcellulose, and carboxymethylcellulose.

Various oxidizing agents can be included in the slurry compositions. These agents generally include any substances which remove metal electrons and raise the atomic valence. Examples of oxidizing agents include, but are not limited to, hydrogen peroxide, urea hydrogen peroxide, monopersulfates, dipersulfates, peracetic acid, percarbonates, organic peroxides such as benzoyl peroxide, di-t-butyl peroxide, periodic acid, periodiate salts, perbromic acid, perbromate salts, perchloric acid, perchloric salts, perboric acid, perborate salts, permanganates, permanganate salts, hydroxylamine, ferric nitrate, and nitric acid.

Chelating agents can further be included in the slurry compositions. Such agents can be used, for example, in abrasive slurries wherein they chemically react with metal ions removed from the polished/planarized surface to form a soluble metal complex to minimize re-deposition of metal ions on the surface of the substrate. Any conventional chelating agents can be used and include, for example, one or more amine or amide groups (e.g. ethylenediaminetetraacetic acid, ethylenediamine, and methylformamide) and organic acids (e.g. iminodiacetic acid and oxalic acid).

Various corrosion inhibitors can further be included in the compositions. These materials, when provided in abrasive slurries, generally react with the fresh polished/planarized surface and/or oxidized surface to passivate the surface and prevent excessive etching of the surface during CMP. Any conventional corrosion inhibitors can be used, including, but not limited to, alkyl amines, imidazole, aminotetrazole, benzotriazole, mercaptobenzothiazole, 5-methyl-1-benzotriazole, benzimidazole, amino, imino, carboxy, mercapto, nitro, alkyl, urea and thiourea compounds and derivatives, etc. Dicarboxylic acids such as oxalic acid, malonic acid, succinic acid, nitrilotriacetic acid, iminodiacetic acid, and combinations thereof.

Various solvents conventionally used in slurries can further be included to provide a medium in which the abrasive particles are dispersed and in which the other components are incorporated. The solvents can be selected from any conventional solvents including, but not limited to, water, alcohols, such as isopropyl alcohol, methanol, ethanol, propanol, butanol, ethylene glycol, propylene glycol, glycerin, ketones, such as acetone, ethers, such as diethylether, tetrahydrofuran (THF), and water-alcohol solutions.

Surfactants can further be included in the abrasive slurries. Suitable surfactants include non-ionic, anionic, cationic, non-ionic, zwitterionic, amphoteric, and polyelectrolyte compounds. Examples of some surfactants for use in the present invention are disclosed in, for example, Kirk-Othmer, Encyclopedia of Chemical Terminology, 3rd Edition, Vol. 22 (John Wiley & Sons, 1983), Sislet & Wood, Encyclopedia of Surface Active Agents (Chemical Publishing Co., Inc. 1964), Ash, The Condensed Encyclopedia of Surfactants (chemical Publishing Co., Inc., 1989), Tadros, Surfactants (Academic Press, 1984), all of which are incorporated herein by reference. Some examples include salts of organic acids, alkane sulfates, alkane sulfonates, hydroxides, substituted amine salts, betaines, polyethylene oxide, polyvinyl alcohol, polyvinyl acetate, polyacrylic acid, polyvinyl pyrrolidone, polyethyleneimine, esters of anhydrosorbitols, quaternary such as tetramethyl ammonium halides, Cetyl trimethyl ammonium halides, nonyl ethers and combinations thereof.

In certain embodiments, the slurries are in the form of abrasive slurries suitable for use in various polishing and planarization processes including CMP, pre-polishing step for stock removal, texturing, etc. In accordance with the present invention, the rates of chemical and mechanical interaction are appropriately balanced to provide optimal polishing performance. It has been found that mechanical abrasion varies with the type of abrasive particles, abrasive particle size, abrasive particle concentration, and particle size distribution. Thus, the present slurry compositions comprise abrasive particles having suitable particle size, concentration, and particle size distribution to provide the appropriate levels of mechanical interaction. Further, the slurry composition is provided with a mixture of two types of abrasive particles having different degrees of hardness, wherein the ratio of the mixture is adjusted so as to provide the appropriate levels of mechanical interaction. In some embodiments, the first type of abrasive particles have a hardness that is harder than the work surface being polished, while the second type of abrasive particles have a hardness that is softer than the work surface being polished. Further, the slurry compositions can be used in a CMP process wherein the operational variables, such as applied pressure and velocity of the polishing pad, are controlled to provide the desired polishing and planarization properties.

Figure 1:
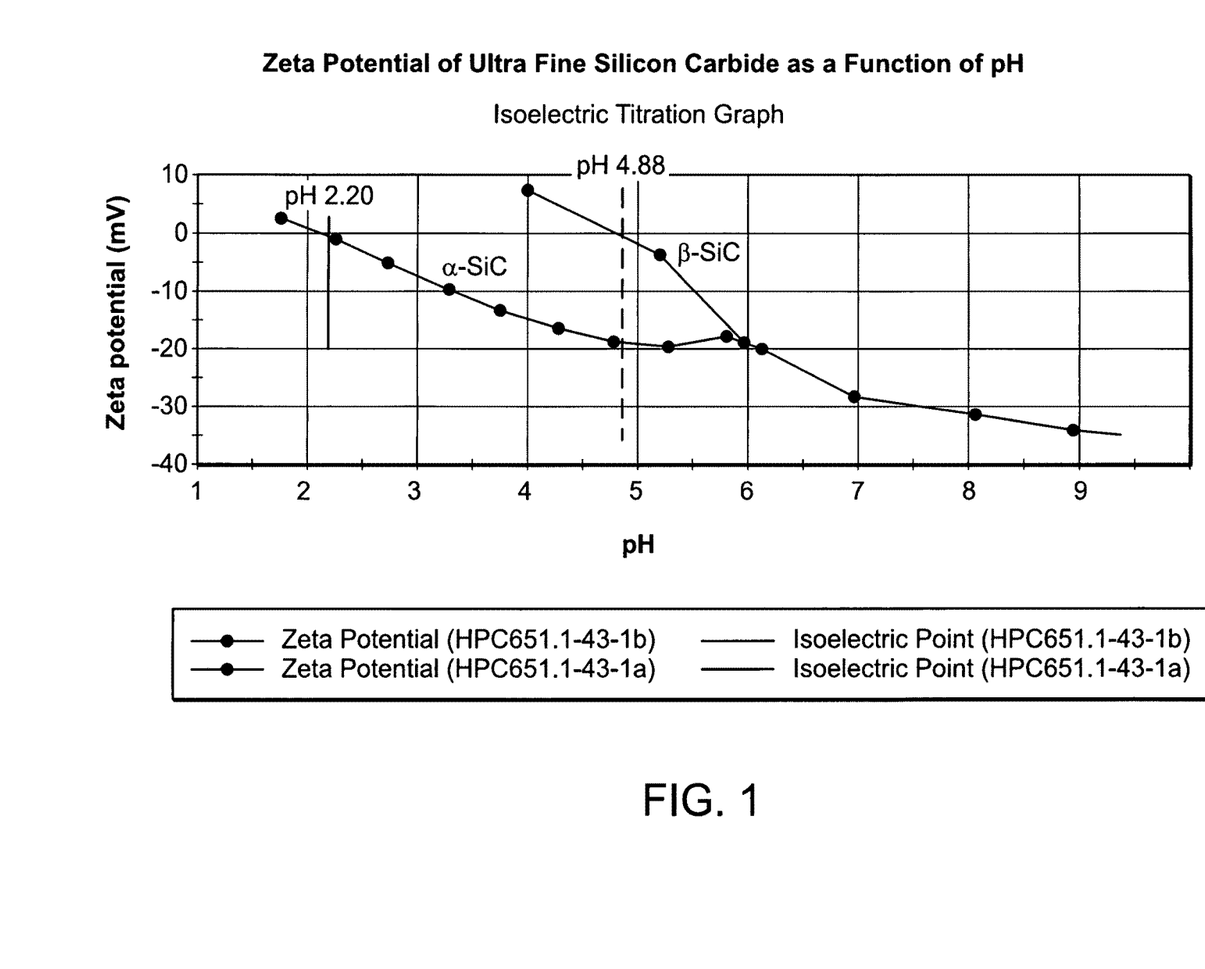
FIG. 1 shows the zeta potential of ultra fine silicon carbide as a function of pH.
Figure 2:
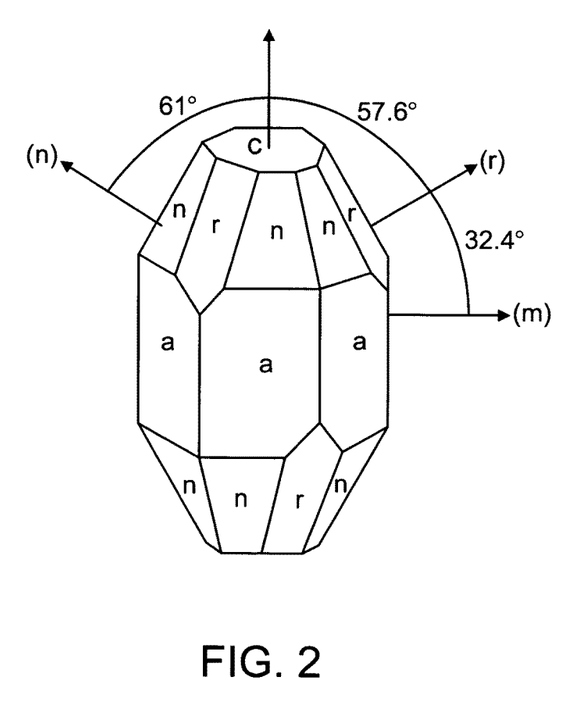
FIG. 2 demonstrates the C-plane, A-plane, and R-plane of sapphire.

The abrasive slurry compositions of the present invention comprise a mixture of silicon carbide abrasive particles, particularly α-phase silicon carbide abrasive particles, and silica abrasive particles, particularly colloidal silica abrasive particles. The combination of silicon carbide and silica is particularly advantageous because the hardness of silicon carbide is much higher than silica. It has been found that the removal rates of some substrates (e.g. hard substrates/substrates resistant to polishing) can be less than optimal using silica abrasives alone and, thus, in accordance with the present invention, silicon carbide is added to enhance the removal rate. The silicon carbide, in some applications, is ultra-fine (no greater than 300 nm average particle size). In some applications, the silica is colloidal silica, which generally has a particle size of the order of less than 100 nm. The relative softness of the silica particles provides the ability to polish the R-plane wafers with minimal defects and scratching, while the relative hardness of the silicon carbide particles enhances the removal rate of the slurry. It has been found that the addition of silicon carbide enhances the surface finish of R-plane sapphire relative to the use of silica slurries alone, and reduces the polishing time of R-plane sapphire wafers relative to the use of silica slurries alone. Further, the surface on silicon carbide is negatively charged and, thus, similar to that of colloidal silica. As shown in FIG. 1, the zeta potential or surface charge potential of silicon carbide increases in magnitude with increasing alkalinity, which is very similar to silica. Thus, for example, combining SiC with colloidal silica results in a colloidally stable composite slurry system that is useful for polishing and planarizing the surfaces of various materials.

In embodiments of the invention, the silicon carbide can be present in an abrasive slurry in an amount sufficient to enhance the removal rate of the R-plane sapphire by at least about 10% relative to the rate obtained using a silica slurry that does not contain silicon carbide, under similar polishing conditions. In some embodiments, the removal rate is enhanced by at least about 15%, in some embodiments at least about 20%, in some embodiments at least about 25%, in some embodiments at least about 30%, in some embodiments at least about 35%, in some embodiments at least about 40%, in some embodiments at least about 45%, in some embodiments at least about 50%, and in some embodiments at least about 55%. The present compositions can contain silicon carbide in an amount sufficient to enhance the removal rate of the R-plane sapphire such that a polishing process can be finished at least about five times faster relative to the polishing process using a silica slurry that does not contain silicon carbide, under similar polishing conditions. In some embodiments, the process can be finished about ten times faster. In other embodiments, the process can be finished more than ten times faster. The removal rate can be determined, for example, in relation to obtaining a particular surface finish $R_a$. As shown in FIG. 4, for example, polishing of R-plane sapphire having an Ra=5666 Å to an Ra=6.3 Å takes 23 hours using a colloidal slurry but only 2 hours using a composite silicon carbide/silica slurry of the present invention The present invention, thus, provides abrasive slurries and methods that enhance the polishing of R-Plane sapphire by augmenting silica with silicon carbide, particularly colloidal silica with ultra fine silicon carbide, thereby rendering a composite slurry that enhances the material removal of R-plane sapphire relative to silica. These benefits are realized, in part, because the surface charges on the ultra fine silicon carbide is negatively charged similar to colloidal silica and because SiC is very hard relative to SiO2.

The pH of the present abrasive slurry compositions may be at any suitable value that is efficacious for the specific use of the slurry. For example, when used as an abrasive slurry, the pH can be determined in light of the specific polishing operation employed. For example, for polishing sapphire, the pH can range from about 7 to about 12. To provide a desired pH value, one or more pH adjusting agents can be included in the compositions. The pH adjusting agents can include, for example, any of various bases, such as potassium hydroxide (KOH), sodium hydroxide (NaOH), and ammonium hydroxide, or inorganic and/or organic acids, such as acetic acid, phosphoric acid, or oxalic acid.

It has been found that the pH of abrasive slurries has an effect on the removal rate. In particular, removal rate increases with increased pH. Without being bound by theory, it is believed that, in general, peak removal rates will be achieved at the maximum workable pH for the type of silica used. It has further been found that increases in pressure generally provide increases in removal rate.

The slurries of the present invention are generally made by forming a silicon carbide slurry, forming a colloidal silica slurry, and mixing the two slurries together. The pH of the slurry can be adjusted to disperse the particles before, during, or after mixing.

The present invention is further illustrated by the following examples which should not be construed as limiting in any way. The contents of all cited references (including literature references, issued patents, published patent applications) as cited throughout this application are hereby expressly incorporated by reference. The practice of the present invention will employ, unless otherwise indicated, conventional techniques, which are within the skill of the art. Such techniques are explained fully in the literature.

EXAMPLE

A slurry comprising a mixture of silicon carbide particles and silica particles was prepared in accordance with the present invention. The silicon carbide was α-SiC, with an average particle size of about 130 nm. The slurry contained a total solids content of 30% by weight, of which colloidal silica accounted for 21% by weight and nano-sized silicon carbide accounted for 9% by weight. A slurry of colloidal silica having a total solids content of 30% by weight was also prepared.

Both slurries were used to polish a lapped R-plane sapphire sample at a pH of 9.6 on a Buehler Ecomet 4 polisher under the following conditions where the pressure on the sample being polished was 7 psi. The platen speed on the polisher was 400 RPM (anti-clockwise) and the sample carrier speed was 70 RPM (clockwise). The polishing was carried out on a Suba $H_2$ pad sourced from Rohm & Haas Electronic Materials with a slurry flow rate of 20 ml/min for colloidal silica and composite slurries of nano silicon carbide. Before the onset of polishing the sample weight of R-plane sapphire was measured in grams up to four decimal places and then polished for a period of 4 hours, and an average material removal rate per hour reported as shown in Table 3 for colloidal silica and composite slurries of nano silicon carbide.

Table 3 clearly shows the benefits in enhancing the removal rate of R-plane sapphire by the addition of silicon carbide to silica slurries. As shown, the removal rate of R-plane sapphire was increased by about 43% by the addition of silicon carbide to the slurry.

TABLE 3

Material Removal Rate Comparison between Colloidal Silica and Composite Slurry

| Slurry | Avg. MRR (um/hr) |
|---|---|
| C-SiO2 | 4.69 |
| Composite Slurry | 6.69 |

What is claimed is:

1. A slurry composition comprising silicon carbide particles and silica particles dispersed in an aqueous medium, wherein
    at least portions of the surfaces of the silicon carbide particles comprise silica;
    a total amount of particles of the slurry composition ranges from about 10 wt % to about 50 wt %
    an amount of silicon carbide particles ranges from about 0.1 wt % to about 30 wt %; and
    an amount of silica particles is at least about 10 wt % based on the weight of the slurry composition.
2. The slurry composition of claim 1, wherein the silicon carbide particles have an average particle size no greater than 300 nm.
3. The slurry composition of claim 1, wherein the silicon carbide particles have an average particle size ranging from about 40 nm to about 300 nm.
4. The slurry composition of claim 1, wherein the silica particles comprise colloidal silica.
5. The slurry composition of claim 1, wherein the silica particles comprise fumed silica.
6. The slurry composition of claim 1, wherein the silica particles have an average particle size less than about 100 nm.
7. The slurry composition of claim 1, wherein the silica particles have an average particle size ranging from about 10 to about 300 nm.
8. The slurry composition of claim 1, wherein the silicon carbide particles comprise nano-sized α-silicon carbide particles.
9. The slurry of claim 1, wherein the silicon carbide particles are at least partially oxidized to form the silica provided on the surface portions of the silicon carbide particles.
10. The slurry composition of claim 1, wherein the silicon carbide particles comprise β-silicon carbide particles.
11. The slurry of claim 1, wherein the silicon carbide particles are prepared by reacting a mixture of silica and carbon at a temperature of at least 2000° C.
12. The slurry composition of claim 1, wherein the silicon carbide particles have an isoelectric point of about 2.2.
13. The slurry composition of claim 1, wherein the pH of the slurry is greater than 3.0.
14. The slurry composition of claim 13, wherein the pH of the slurry is at least about 7.
15. The slurry composition of claim 1, wherein the composition comprises at least about 2 wt % silicon carbide particles.
16. The slurry composition of claim 15, wherein the composition comprises from about 2 wt % to about 30 wt % silicon carbide particles.
17. The slurry composition of claim 1, further comprising at least one pH adjusting agent.
18. The slurry composition of claim 17, wherein the at least one pH adjusting agent is at least one selected from the group consisting of potassium hydroxide, sodium hydroxide, and ammonium hydroxide.
19. The slurry composition of claim 18, wherein the at least one pH adjusting agent is at least one acid selected from the group consisting of acetic acid, phosphoric acid, and oxalic acid.
20. The slurry composition of claim 1, wherein the composition is an abrasive slurry composition for polishing sapphire wafers and wherein the silicon carbide particles have a hardness that is harder than the sapphire wafers and the silica particles have a hardness that is softer than the sapphire wafers.
21. The slurry composition of claim 20, wherein the composition comprises an amount of silicon carbide particles sufficient to increase the rate of R-plane sapphire polishing to a particular surface roughness by at least 30% relative to the rate of the composition without the silicon carbide particles.
22. The slurry composition of claim 21, wherein the composition comprises an amount of silicon carbide particles sufficient to increase the rate of R-plane sapphire polishing to a particular surface roughness by at least 35% relative to the rate of the composition without silicon carbide particles.
23. The slurry composition of claim 22, wherein the rate of R-plane sapphire polishing is increased by at least 40%.
24. The slurry composition of claim 22, wherein the rate of R-plane sapphire polishing is increased by at least 45%.
25. The slurry composition of claim 22, wherein the rate of R-plane sapphire polishing is increased by at least 50%.
26. The slurry composition of claim 1, wherein the silica coatings cover not less than about 50% of the total surface of the silicon carbide particles.
27. The slurry composition of claim 26, wherein the silica coatings cover not less than about 70% of the total surface of the silicon carbide particles.
28. The slurry composition of claim 27, wherein the silica coatings cover not less than about 90% of the total surface of the silicon carbide particles.

29. The slurry composition of claim 28, wherein the silica coatings cover not less than about 95% of the total surface of the silicon carbide particles.

30. A slurry composition comprising two different types of particles dispersed in an aqueous medium, wherein
- the particles consist essentially of silicon carbide particles and silica particles;
- at least portions of the surfaces of the silicon carbide particles comprise silica; and
- a total amount of particles of the slurry composition ranges from about 10 wt % to about 50 wt %.

* * * * *